US006828499B2

(12) United States Patent
Max

(10) Patent No.: US 6,828,499 B2
(45) Date of Patent: Dec. 7, 2004

(54) APPARATUS AND METHOD FOR HARVESTING ATMOSPHERIC MOISTURE

(75) Inventor: Michael David Max, St. Pete Beach, FL (US)

(73) Assignee: Marine Desalination Systems, L.L.C., Washington, DC (US)

(*) Notice: Subject to any disclaimer, the term of this patent is extended or adjusted under 35 U.S.C. 154(b) by 0 days.

(21) Appl. No.: 10/323,920

(22) Filed: Dec. 20, 2002

(65) Prior Publication Data

US 2003/0150483 A1 Aug. 14, 2003

Related U.S. Application Data

(60) Provisional application No. 60/341,861, filed on Dec. 21, 2001.

(51) Int. Cl.[7] .................. H01L 31/052; H01L 31/058; F25B 27/00
(52) U.S. Cl. .............. 136/246; 136/244; 136/248; 136/291; 136/203; 136/205; 136/206; 96/188; 95/115; 62/93; 62/3.2; 62/235.1; 62/236
(58) Field of Search .................. 136/244, 246, 136/248, 291, 203, 205, 206; 96/188; 95/115; 62/93, 3.2, 235.1, 236

(56) References Cited

U.S. PATENT DOCUMENTS 5,275,643 A * 1/1994 Usui ..................... 96/188

| 5,846,296 A | * | 12/1998 | Krumsvik ........... 95/115 |
| 5,857,344 A | * | 1/1999 | Rosenthal ........... 62/93 |
| 6,182,453 B1 | | 2/2001 | Forsberg ........... 62/125 |
| 6,581,849 B2 | * | 6/2003 | Zhang ........... 239/63 |

FOREIGN PATENT DOCUMENTS

| CN | 1223325 A | * | 7/1999 |
| DE | 3541645 A1 | * | 6/1987 |
| ES | 2156707 A1 | * | 7/2001 |
| JP | 9-99201 A | * | 4/1997 |

OTHER PUBLICATIONS

Basic Photovoltaic Principles and Methods, Solar Energy Research Institute, (1984), pp. 171–173.*

* cited by examiner

Primary Examiner—Alan Diamond
(74) Attorney, Agent, or Firm—Pillsbury Winthrop LLP

(57) ABSTRACT

A condensation panel to be used for harvesting water from atmospheric moisture during those times of the diurnal cycle when relative humidity is at or near 100% utilizes very localized cooling to optimize condensation on a surface whose materials promote the condensation and collection of the water. The panel is passive in the sense that it can be deployed and left in an unmaintained condition for considerable periods of time. At least one time each day, almost certainly in the morning, water harvested by the process of assisted condensation can be collected for use.

7 Claims, 1 Drawing Sheet

APPARATUS AND METHOD FOR HARVESTING ATMOSPHERIC MOISTURE

Figure 1:
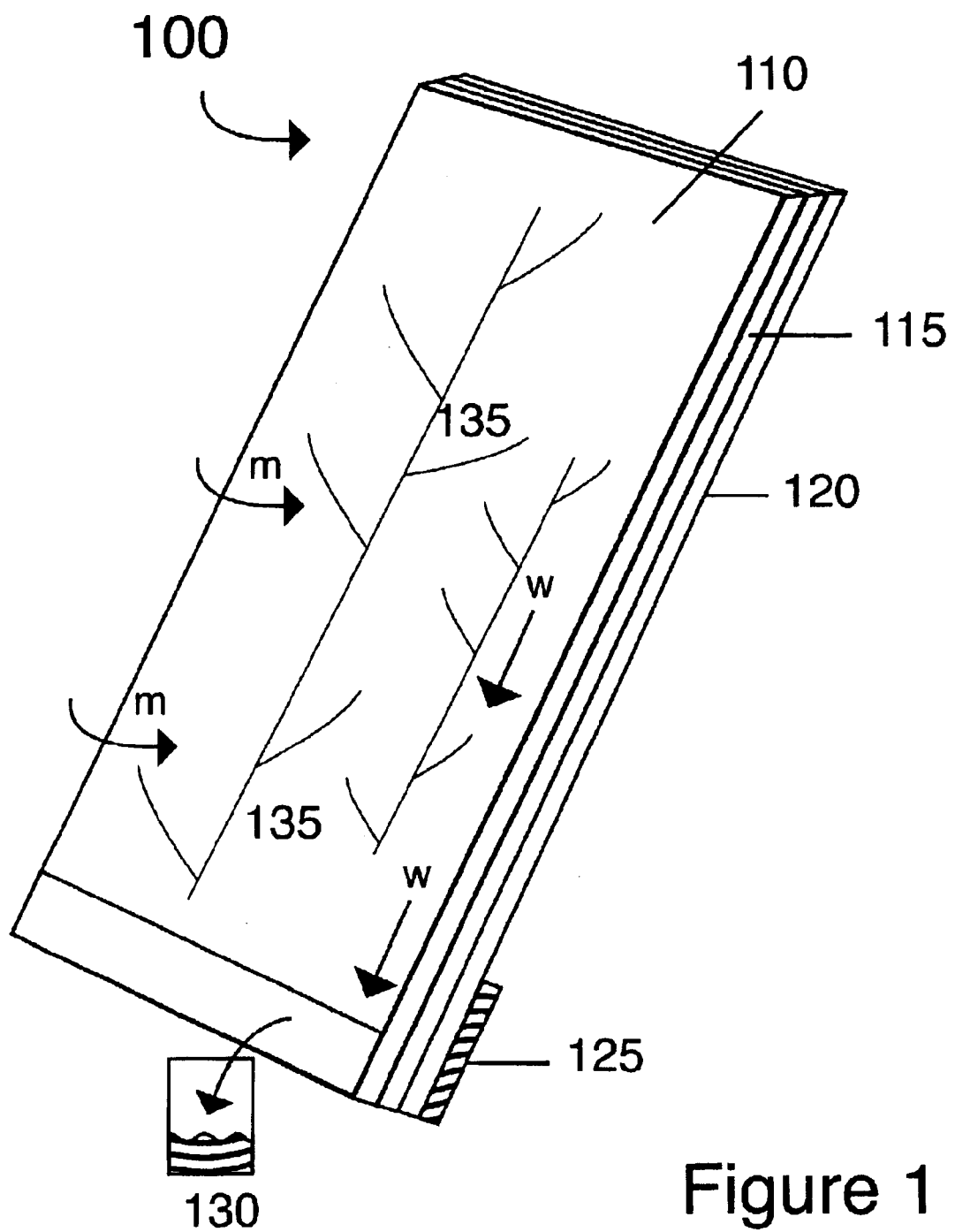

This application claims priority from and the benefit of provisional patent application Ser. No. 60/341,861 filed Dec. 21, 2001, the contents of which are incorporated by reference.

This invention was made with Government Support under Contract Number NBCHC010003 dated Jan. 29, 2001 and issued by the Department of the Interior-National Business Center (DARPA). The Government has certain rights in the invention.

1. FIELD OF THE INVENTION

In general, the invention relates to "harvesting" water from the atmosphere.

2. BACKGROUND OF THE INVENTION

Military expeditionary activity and other field deployments such as for disaster relief requires considerable amounts of fresh water. Water, for instance, constitutes about 40% of the required logistics support. This situation imposes considerable logistical "drag" in the supply system. The requirement to deliver water to forward deployments has been known to delay delivery of other requirements such as fuel, ammunition, and other military supplies, which affects timeliness and possibly even success of the mission. Likewise, persons traveling in areas where water is scarce or of dubious quality often must settle for treated water that is medically acceptable but unpalatable. Remote location water treatment procedures are often difficult to implement properly.

The U.S. Department of Defense recommends 1–3 gallons of water per soldier per day, but accepts 1 gal/day as a minimum in constrained circumstances. On a daily basis, a 2–3 quart water deficit leads to a 50% degradation in performance, and a 4-quart deficit renders the soldier incapacitated after as few as three days. On average, a soldier loses 600 mL of water per day via evaporation from the skin, 350 mL via respiration, 15 mL via urine, but gains 350 mL via metabolism (water of combustion).

Ideally, in a maneuver situation, a group of soldiers would be supplied with the equivalent of 3–7 days worth of water without re-supply. Current doctrine allows for 6.6 gallons of water per day for all uses (imbibing, washing, cooking, laundry, etc), but a "fully developed" theater requires 15.6 gallons of water/soldier/day. Thus, an Army brigade will use 106 tons (English units) of water per day (1 gallon of water weights 8.3 lbs).

Providing water for forward deployments of military expeditionary activity or disaster relief situations has typically required either "tankering in" already treated water or finding water near the locality where the water is required and treating it on site. In the former case, shortening the distance over which the potable water must be brought is the first order solution to water supply. Deployable desalination and water purification equipment considerably shortens the logistical supply chain and provides a major saving of logistical transport capacity. Current Army water treatment procedure for producing potable water from saline or brackish water is to pretreat (e.g., filter) the water, followed by reverse osmosis, deionization and fine filtering and by chlorination. This water supply protocol is energy- and equipment-intensive, and water supply operations are easily disrupted in a conflict or high stress situation.

With respect to the latter procedure, in the operational area (OPAREA), deployed personnel must find and treat water. A conventional source (river, puddle, well, etc.) is usually available, but this found water usually must be treated to bring it to acceptable, safe drinking water standards. In practice, these standards may not be reached, and this situation is usually reflected in the declining health of field personnel. Thus, better methods for obtaining water are needed, particularly in arid and semi-arid areas where water is very scarce and often highly brackish with dissolved solids.

3. SUMMARY OF THE INVENTION

According to one embodiment of the invention, a self-contained apparatus for harvesting water from the atmosphere converts sunlight to electrical energy via photovoltaic systems; stores that electricity; and then uses the electricity to provide modest refrigeration on the panel face to foster condensation of atmospheric moisture. These essentially passive condensation panels can be fabricated as structural elements of existing equipment, such as the panel sides of ambulances and some portable buildings, or provided as flexible, collapsible panels that can be hung from frames or existing points of opportunity such as trees.

The present invention provides a new method and apparatus for harvesting atmospheric moisture using a light-weight, self-contained, "passive" system for harvesting water from atmospheric moisture at those times of the diurnal cycle when relative humidity is at or close to 100%. Although the air may contain lower percentages of water during the heat of the day, most local air masses carry considerable volumes of air at near relative humidity for several hours each early morning. At these times, accelerated collection of water may be carried out using water harvesting panels according to the invention. Although it is believed that the invention will not provide all required water in all circumstances, it is believed that the invention will provide water in significant quantities to reduce substantially the amount of water that presently has to be transported, usually in hazardous conditions and at great cost. This reduced water transport requirement will be reflected by reduced costs and increased operational capability as the operational elements and personnel freed up can be used for more direct, militarily relevant materials and supplies.

According to the invention, a panel or surface is cooled in the presence of air containing significant amounts of moisture. Heat absorption on the surface of the panel, which is maintained at a temperature that is below the ambient temperature but above a heat-absorbing level that would cause freezing of condensing water, promotes and accelerates condensation on the surface. The surface on which the condensation takes place is preferably coated with suitable hydrophilic and hydrophobic materials disposed so as to promote the condensation and flow and collection of condensing water along channelways. The nature of the surface may be altered electrically, chemically, or by other means to allow it to promote condensation of water, and its subsequent gathering.

Panels can be employed in fixed shape form or in collapsible and flexible form. Panels may replace existing structural parts of vehicles or equipment panels such as the sides of ambulances and other vehicles and some portable buildings. They may be used as part of prepared camouflage, as they must be non-reflective and virtually noiseless. Deployed within tents or buildings, the units will be capable of recovering respired water vapor.

In some types of this apparatus, there may be few or no moving parts. Ideally, all components are solid state and hardened, although micro-refrigeration circulation systems or embedded heat/refrigeration systems may be employed.

4. BRIEF DESCRIPTION OF THE DRAWINGS

The invention will now be described in greater detail in connection with the drawing, in which:

FIG. 1 is a generalized perspective view of a water harvesting panel according to the invention.

5. DETAILED DESCRIPTION OF THE PREFERRED EMBODIMENTS

The invention extracts fresh water from atmospheric moisture by promoting condensation of moisture from the atmosphere. In one embodiment (FIG. 1), a condensation panel 100 has three main parts: a photovoltaic section 110; a cooling section 115 formed into a single panel; and a lightweight, high energy density, rechargeable battery or capacitor assembly 125. A further backing layer 120 may be insulation, a radiator, or a backing panel having some other purpose. The condensation panel produces electrical energy that is stored in the battery 125, which may be an integral part of the panel. The surface on which the condensation takes place is preferably coated with suitable hydrophilic and hydrophobic materials disposed so as to promote the condensation and flow and collection of condensing water along channelways 135. The nature of the surface may be altered electrically, chemically, or by other means to allow it to promote condensation of water, and its subsequent gathering. The principal element governing the condensation of atmospheric moisture and its optimization through cooling or refrigeration is a cooling panel. The panel combines different technologies in a new manner to provide for a passive water condensation/collection system utilizing thin solar panels that are affixed to thin refrigeration panels as backing. Also built into a single integrated structure are computer control and local simple programming capability, sensors, and lightweight, rechargeable batteries or capacitor systems.

Each day consists of a diurnal cycle during which the relative humidity varies in a normal cycle (in the absence of precipitation). During daylight hours, the photovoltaic portion 110 of the panel converts solar energy to electricity, and that energy is stored in battery 125. At night, when the relative humidity rises with falling ambient temperature, the temperature of the panel is regulated with respect to relative humidity to cause atmospheric moisture m to condense into water w on the face of the panel. Water runoff 130 from the panel is collected at the base of the panel.

Panel temperature and attitude/position is used to establish air circulation. Even with no refrigeration, some condensation and water collection will occur. With the addition of cooling, which is controlled by onboard computer (preferably with IR communications capability for programming for local conditions in a completely weatherproof manner), and fiber optic or other miniature sensors, the condensation process can be optimized and accelerated.

The water harvesting apparatus is designed to be portable and light-weight and to have few or no moving parts. It is composed of materials that provide for durability and reliability of operation so that it can be "hardened" for rough handling. Panels may be fabricated in adaptive shapes wherein they take the place of panels on vehicles or some buildings. Alternatively, they may be fabricated to be flexible, folding, or otherwise collapsible so that they can be transported in a compact form and deployed in the field, much like sails or tent segments. Because the panels automatically respond to the normal diurnal cycle of warming and being exposed to direct sunlight during the day and cooling through the night with the accompanying variation in relative humidity, they are passive in that they can be deployed for continued use without undue maintenance or control.

An example of the relationship between electricity that can be generated by photovoltaic and the relative amount of water that may be condensed can be derived from the existing Army requirement for the production of about 7 quarts of water per soldier per day. It is known that about 600 Watt-Hours is required to condense each quart of water. (Where additional cooling is provided by the environment and not by the panel itself, this energy requirement may be substantially reduced.) Commercial, low-power density photovoltaic panels are available in a wide variety of sizes and material backings. Both rigid and flexible photovoltaic panels are available, and specially fabricated panels can be obtained. Power production of a typical commercial, off-the-shelf, six-foot X six-foot solar panel is about 500 Watts. Thus, in about an 8 hour charge period, at least enough electricity to condense abut 7 quarts of water can be generated. Because it is most likely that small groups of personnel will use a single lightweight portable panel, a relatively small "sail" area may have enough area to significantly reduce the delivered or found water requirement.

One type of cooling that may be employed for the cooling section 115 of the panel is miniaturized conventional refrigeration. Conventional refrigeration devices operate using a vapor-cycle, have moving mechanical parts, and require a working fluid. In a conventional refrigeration system, a fluid is circulated that is cooled in a heat exchanger located away from the area in which cooling is desired and then circulated to a heat exchanger in the area to be cooled, where the fluid absorbs heat energy and transports it away. Conventional refrigeration systems are closed loops. Older systems circulated a fluid with a high thermal capacity such as oil or brine. In a small efficient system, the main working parts are the evaporator, condenser, and compressor and special refrigerant material that may change state from liquid to gas in the refrigeration cycle. The evaporator is that part of the system where the refrigerant in liquid form cools a given area as it is vaporized to a gas. In doing so, it can absorb considerable heat energy in the area being cooled. The compressor circulates the refrigerant and applies enough pressure to increase the temperature of the refrigerant above ambient level. The condenser helps discharge the absorbed heat into a heat sink such as the atmosphere.

For use in the panel, the entire cooling system is miniaturized, with small condenser pumps and micro-channel refrigerant channels. Equipment such as this has been produced for some flying, professional diving, and space exploration activities. Thus, a miniaturized conventional refrigeration system may be used in the invention. In this case, a heat exchanger such as metalized flexible plastic segments would be preferably located on the back of the panel.

The major disadvantages of using miniaturized conventional refrigeration in the assisted condensation panel is that it involves some mechanical parts, which may malfunction, and contains a fluid, which may leak. Both circumstances may render the apparatus inoperative. Larger panels may employ conventional refrigeration as these may be deployed in base situations where they are handled less often and where maintenance is more likely.

Another method of refrigeration that may be employed is thermoelectric cooling. Thermoelectric coolers (TECs) are solid state heat pumps that utilize the Peltier effect. The Peltier effect, which is a solid-state method of heat transfer through dissimilar semiconductor materials, was discovered in 1834 and involves current flow between two materials having certain dissimilar electrical properties. The devices became practical only recently, however, with the development of semiconductor thermocouple materials. An example of a common material that is currently used is bismuth telluride, which is a quaternary alloy of bismuth, tellurium, selenium and antimony that is doped and processed to yield oriented polycrystalline semiconductors with anisotropic thermoelectric properties. The couples are usually connected in series electrically and in parallel thermally, and are integrated into modules that may be packaged between metalized ceramic plates to afford optimum electrical insulation and thermal conduction with high mechanical strength.

A thermoelectric refrigeration system consists of three elements: a cold junction, a heat sink, and a DC power source. During operation, DC current flows through the TEC causing heat to be transferred from one side of the TEC to the other, thus creating a cold side and a hot side. The cold and hot sides may be separated by some distance. A single-stage TEC can achieve temperature differences up to 70° C., or can transfer heat at a rate of 125 W. Greater temperature differences (up to 131° C.) can be achieved. The temperature differences required to cool an assisted condensation panel are very low, perhaps on the order of one-quarter to several degrees C. below ambient, which increases the efficiency of the thermoelectric system.

Thermoelectrics perform the same cooling function as vapor compression or absorption refrigerators, but the thermoelectric elements are completely solid state and contain no mechanical parts or fluids or gases. Because they are solid state, precision temperature control is possible, and there is a minimum of electrical noise, if any. There is no sound or vibration with thermoelectrics, whose existing commercial products have lifetimes of more than 200,000 hours. Changing direction of current flow provides for heating or cooling on either panel.

TEC's are commonly used for sophisticated instruments and communication systems requiring very small, low current modules, whereas low-cost, high capacity modules are in demand for a growing number of commercial applications. Modules can be mounted in parallel to increase the heat transfer effect or they can be stacked in multistage cascades to achieve high differential temperatures (an attribute not required in an assisted condensation panel per the invention).

It is known that condensation may form on the cold side of a thermoelectric system when the surface temperature drops below the local dew point temperature. Although procedures exist to reduce this operating condensation in existing systems where moisture is not desirable, it is precisely the attribute of normally occurring condensation that indicates that thermoelectric cooling may be appropriate for the cooling element of an assisted condensation panel. Other benefits of thermoelectric cooling of assisted condensation panels include high reliability, small size or capacity, low cost, low weight, intrinsic safety for hazardous electrical environments, and precise temperature control and low power consumption, especially where low temperature differentials are used.

Other types of refrigeration may also be used in the cooling panel, and other forms of compositing different physical elements of an assisted condensation panel are possible. The embodiments described here are meant to be illustrative of the method and process of both a simple and compound assisted condensation panel system, and other variations are intended to be understood in this way.

Local conditions will strongly govern use and special procedures will govern use. Relative humidity of air is often very irregularly disposed. For instance, in the immediate foothills of mountains, cold moist air flows off the high ground and through air gaps near the hill base. A panel exposed in this stream of often slowly moving, relatively heavy air will produce much more water by condensation than a panel exposed even very nearby, where the air is not so moist.

Various modifications to and departures from the specific embodiments disclosed herein will occur to those having skill in the art and are deemed to be within the scope of the following claims.

What is claimed is:

1. A moisture-harvesting panel assembly for harvesting atmospheric moisture, comprising:

a photovoltaic panel which gathers solar energy during daylight hours, said photovoltaic panel having a light-receiving/condensation surface on which light falls during daylight hours and on which surface atmospheric moisture can condense;

an energy-storing member which stores energy converted from said solar energy by said photovoltaic panel during daylight hours;

and a cooling system that is affixed to said photovoltaic panel so as to cool said light-receiving/condensation surface, said cooling system being powered by said energy-storing member;

wherein said energy-storing member powers said cooling system to cool said light-receiving/condensation surface during periods in the diurnal cycle during which relative humidity is increased, whereby condensation of atmospheric moisture on said light-receiving/condensation surface is enhanced and water formed thereby can be gathered.

2. The panel assembly of claim 1, wherein said coolant system comprises a miniaturized cooling system comprising small condenser pumps and micro-channel refrigerant channels.

3. The panel assembly of claim 1, wherein said coolant system comprises a multiplicity of solid state heat pump, thermoelectric coolers.

4. The panel assembly of claim 1, wherein said energy-storing member comprises a rechargeable battery.

5. The panel assembly of claim 1, wherein said energy-storing member comprises a capacitor.

6. A method of harvesting atmospheric moisture, said method comprising:

collecting and storing converted solar energy during daylight hours, when relative humidity is relatively low, using a photovoltaic panel;

during periods in the diurnal cycle during which relative humidity is increased, using said stored, converted solar energy to cool a light-receiving/condensation surface of said photovoltaic panel, whereby condensation of atmospheric moisture on said light-receiving/condensation surface is enhanced; and collecting water resulting from condensation of atmospheric moisture on said light-receiving/condensation surface.

7. The method of claim 6, wherein said light-receiving/condensation surface is cooled by means of a cooling system that is affixed to said photovoltaic panel.

* * * * *